United States Patent [19]
Carlson

[11] 3,937,336
[45] Feb. 10, 1976

[54] PALLETIZING AND DEPALLETIZING APPARATUS FOR SUPPLEMENTAL FEED

[76] Inventor: Kenneth G. Carlson, 11350 N. Valley Drive, 18 W., Mequon, Wis. 53092

[22] Filed: Oct. 23, 1974

[21] Appl. No.: 517,263

[52] U.S. Cl. .............. 214/6 P; 214/6 N; 214/6 TS; 214/8.5 A; 214/8.5 F
[51] Int. Cl.² ........................................ B65G 60/00
[58] Field of Search .......... 214/6 P, 6 N, 6 F, 6 TS, 214/8.5 A, 8.5 F; 198/235

[56] References Cited
UNITED STATES PATENTS

| | | | |
|---|---|---|---|
| 2,508,861 | 5/1950 | Jessen | 214/6 P X |
| 2,774,489 | 12/1956 | Guigas | 214/6 H |
| 2,949,179 | 8/1960 | Busse | 214/6 N X |
| 3,442,401 | 5/1969 | Wolfe et al. | 214/6 P |
| 3,770,143 | 11/1973 | Breitbach | 214/8.5 A X |
| 3,788,497 | 1/1974 | Carlson | 214/6 P |
| 3,865,258 | 2/1975 | Müller | 214/6 P X |

Primary Examiner—Robert J. Spar
Assistant Examiner—Leslie J. Paperner
Attorney, Agent, or Firm—Wheeler, Morsell, House & Fuller

[57] ABSTRACT

A conveying system for conveying cans from a can-making machine to a can-filling machine includes a first conveyor to supply cans from the can-making machine to the filling machine and a second conveyor or supplemental feed conveyor at right angles with a first conveyor to convey excess cans made by the can-making machine to a palletizing apparatus which includes pattern-forming means and a pallet elevator. When the flow of cans exceeds the requirements of the can-filling machine, the cans are diverted from the can-filling machine, patterned, and palletized in layers in the pallet elevator. When the can-making machine is not supplying the requirements of the can-filling machine, or the can-making machine is shut down, stored cans are depalletized and conveyed onto the first conveyor. If the making machine is operating slower than the requirements of the filling machine, the second conveyor provides a supplemental feed of cans to the first conveyor. A sensor in the flow path to the filling machine senses a lack of movement of cans to the filling machine and thus an adequate supply of cans to the filling machine to actuate a gate to divert cans to the supplemental feed conveyor for palletizing and storage to thus enable continuous running of both the can-making and can-filling machines.

4 Claims, 10 Drawing Figures

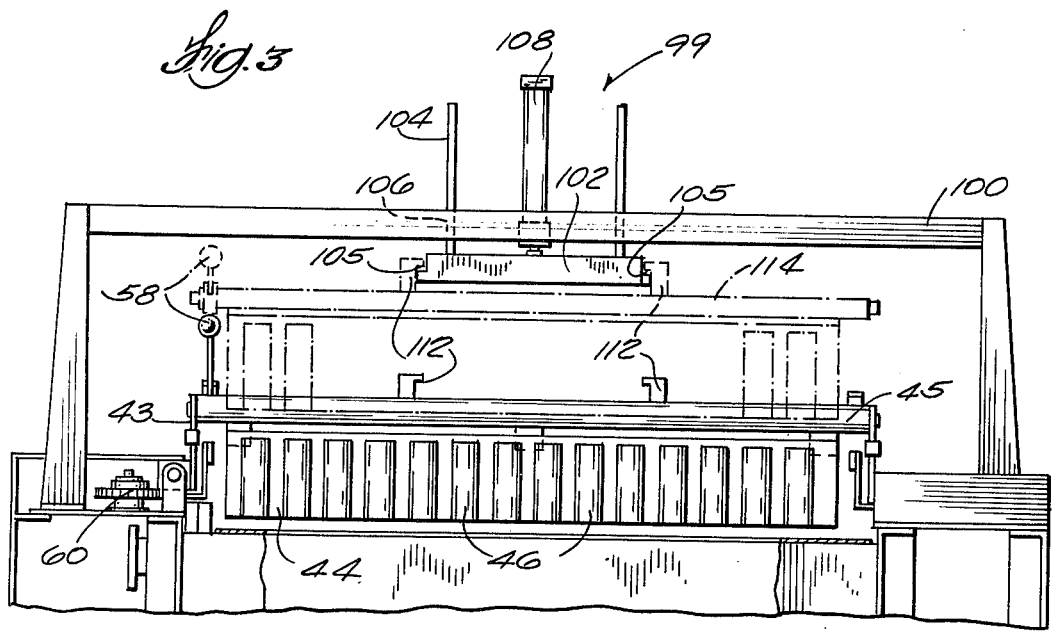
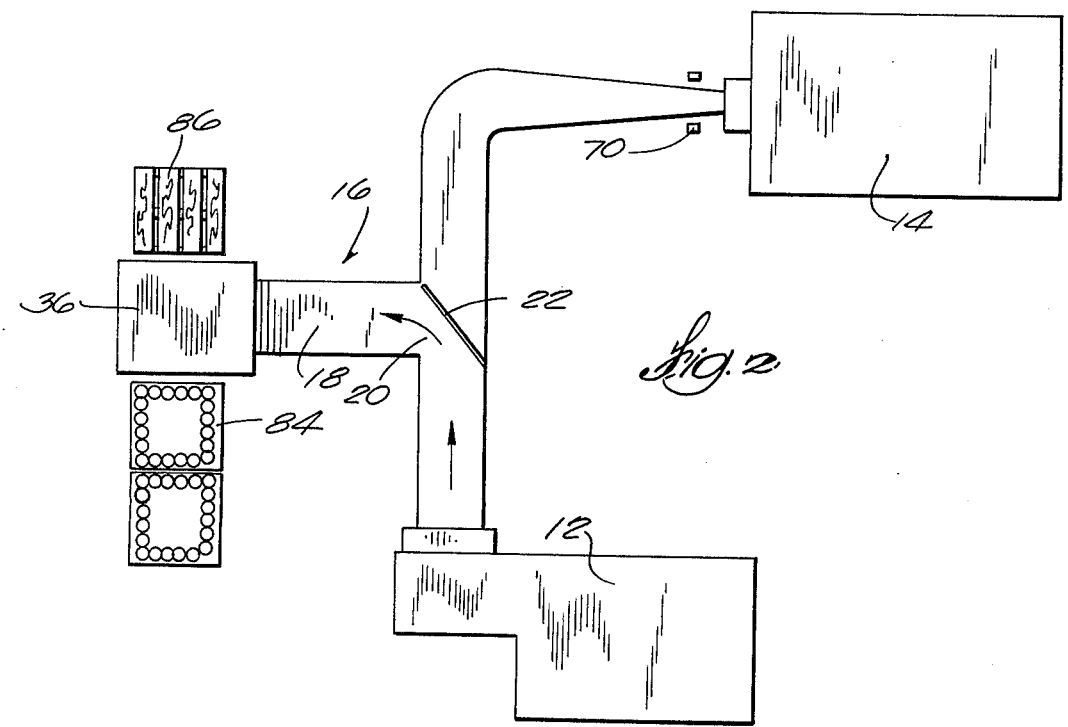

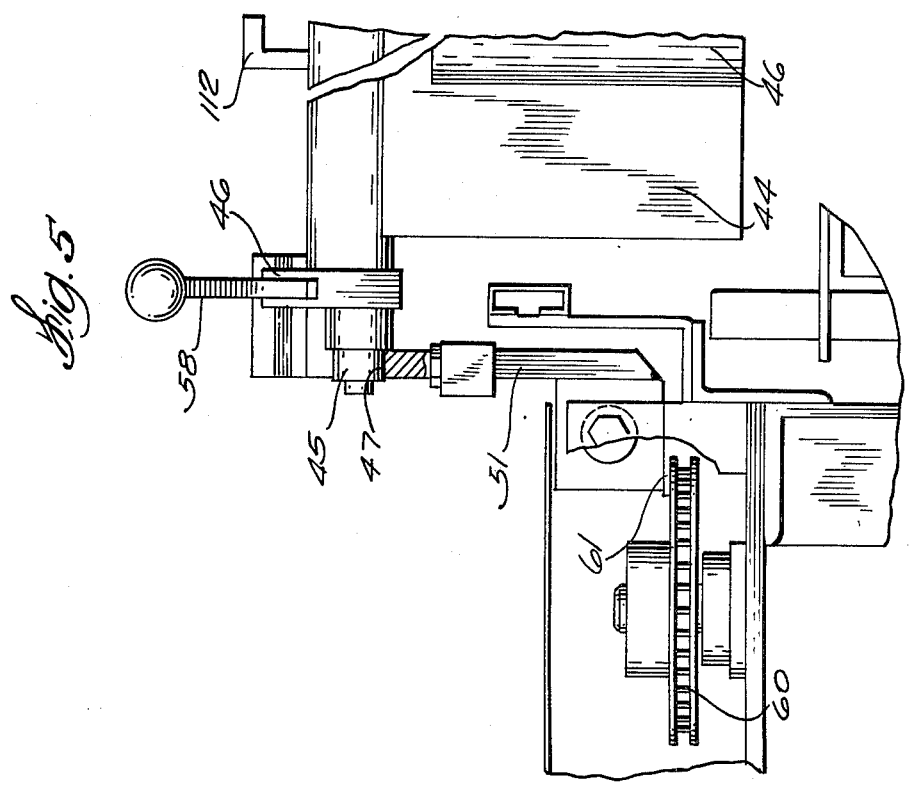
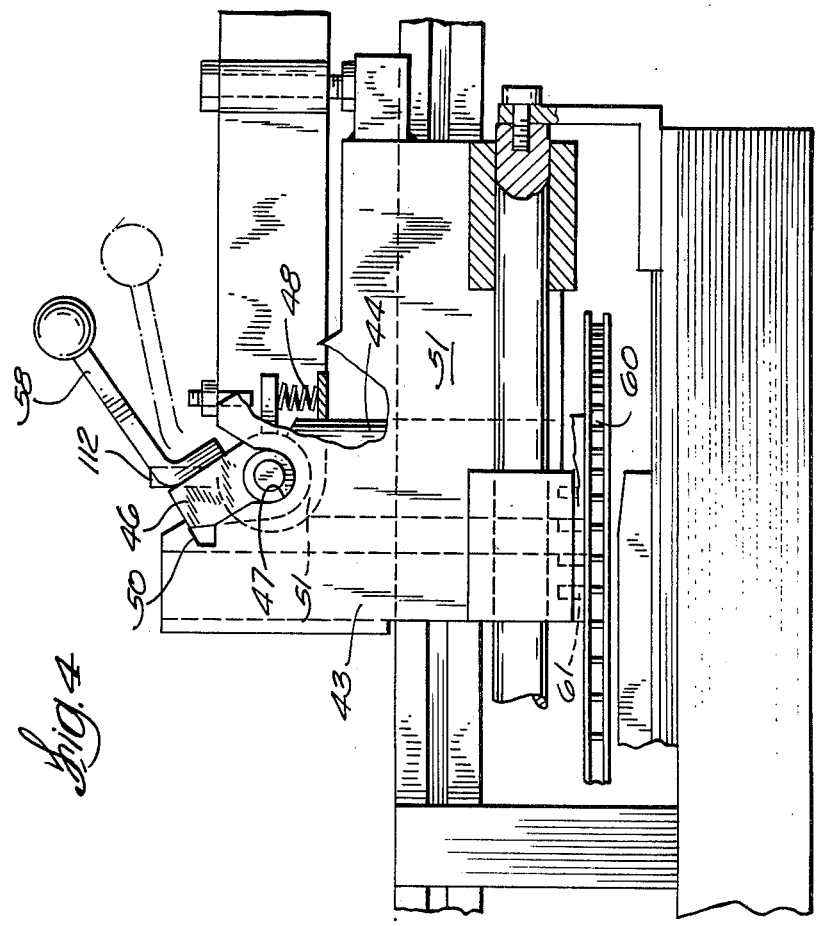

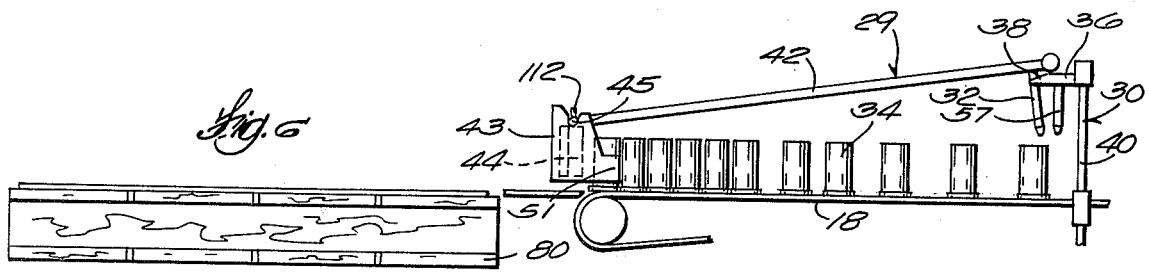
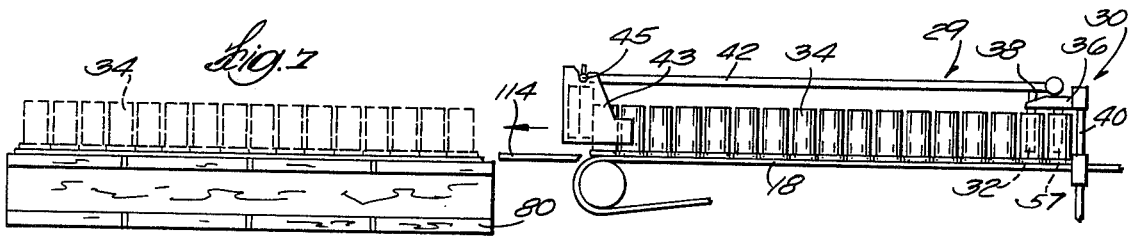
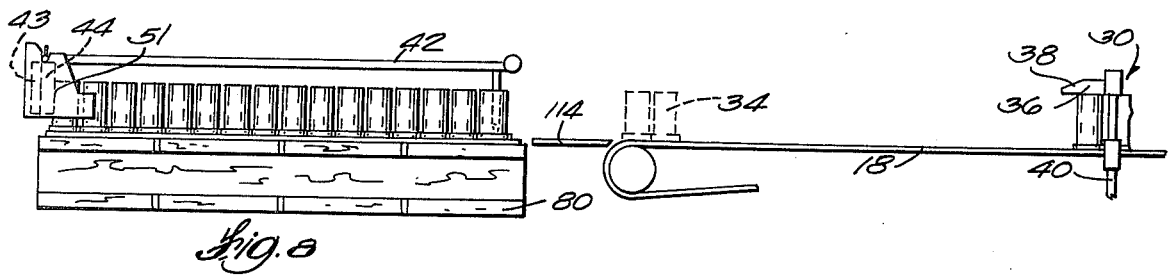
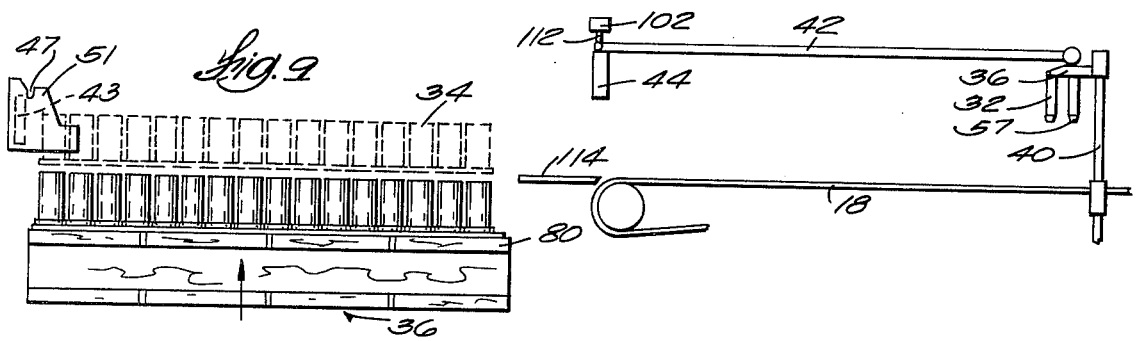
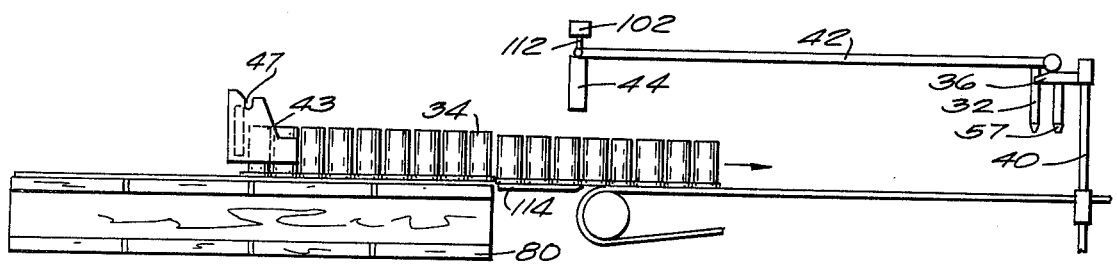

PALLETIZING AND DEPALLETIZING APPARATUS FOR SUPPLEMENTAL FEED

BACKGROUND OF THE INVENTION

The invention is a further development of the subject matter of my U.S. Pat. No. 3,788,497. In this patent, pattern-forming, palletizing and depalletizing apparatus were located directly in the flow path of cans from a can-making machine to a can-filling machine. With the apparatus disclosed in the foregoing patent, if there is a shutdown because of mechanical problems in the palletizing-depalletizing apparatus, this shutdown will interfere with the flow of cans between the can-making machine and the can-filling machine.

SUMMARY OF THE INVENTION

The invention provides a conveying system which is not in the direct flow path between the can-filling and can-making machines but is in communication or joins the conveyor between the two machines. The supplemental feed apparatus of the invention is employed if the conveyor supplying cans from the can-making machine to the can-filling machine cannot supply the requirement of the can-filling machine. In the event the requirement of the filling machine cannot be supplied by the can-making machine, cans stored in patterned layers on pallets can be depalletized to provide a supplemental feed of cans onto the first conveyor in addition to the supply of cans from the making machine. The can supply for the supplemental feed apparatus uses as its source of cans, cans from the same can-filling machine which are diverted from the first conveyor onto the supplemental feed conveyor when the can-filling machine is not operating or when the capacity of the making machine exceeds the requirements of the filling machine. These excess cans are palletized in patterned layers on pallets which are stored adjacent to the pallet elevator.

The supplemental feed apparatus includes a sweep bar and pattern-forming assembly which is movable from a position adjacent the end of the second conveyor and the pallet elevator to a position over the pallet elevator and remote from the end of the second conveyor. The sweep bar and pattern-forming bar are detachably connected and separated during the depalletizing operation. In this regard, an overhead bridge at the end of the second conveyor adjacent the pallet elevator is provided with a lift which raises the pattern bar from the flow path of cans being depalletized by the sweep bar from pallets in the pallet elevator.

A sensor on the first conveyor downstream of the communication zone between the main conveyor and supplemental feed conveyor senses lack of movement of cans on the first conveyor for instance when the supply of cans exceeds the production of the filling machine and causes a gate to be positioned across the communication zone to divert flow of cans from the can-making machine onto the supplemental feed conveyor for palletizing and storage.

Thus, the supplemental feed apparatus of the invention enables continuous operation of the can-making machine and can-filling machine or intermittent use of either of these machines, with the supplemental feed apparatus employed to maintain a continuous flow to the filling machine or absorb excess cans from the making machine.

Further objects, advantages and features of the invention will become apparent from the following disclosure.

DESCRIPTION OF THE DRAWINGS

FIG. 2 is a plan view on a reduced scale of the supplemental feed apparatus of the invention including a can-filling station and can-making station.

FIG. 3 is an enlarged, fragmentary, elevational view of the pattern-forming bar and overhead suspension bridge.

FIG. 4 is an enlarged, fragmentary view in section showing the end of the pattern bar.

FIG. 5 is an enlarged view of a portion of FIG. 3 showing the pattern-forming bar and lock mechanism for detachably connecting the pattern-forming bar with the sweep bar.

FIG. 6 is a diagrammatic side view showing the position of the sweep bar and pattern-forming bar during the step of forming the initial pattern of cans.

FIG. 7 is a diagrammatic view showing the completed pattern of cans with the fingers lowered into the cans in the rear ranks of the patterned can complement.

FIG. 8 is a diagrammatic view showing in solid lines a patterned layer of cans on a pallet with the position of the sweep bar and pattern-forming bar at the time of deposition of the layer of cans on the pallet.

FIG. 9 is a diagrammatic side view showing the position of the pattern-forming bar and sweep bar during the depalletizing of cans from the pallet.

FIG. 10 is a diagrammatic side view showing a layer of cans being swept from a pallet.

DETAILED DESCRIPTION OF PREFERRED EMBODIMENT

Figure 1:
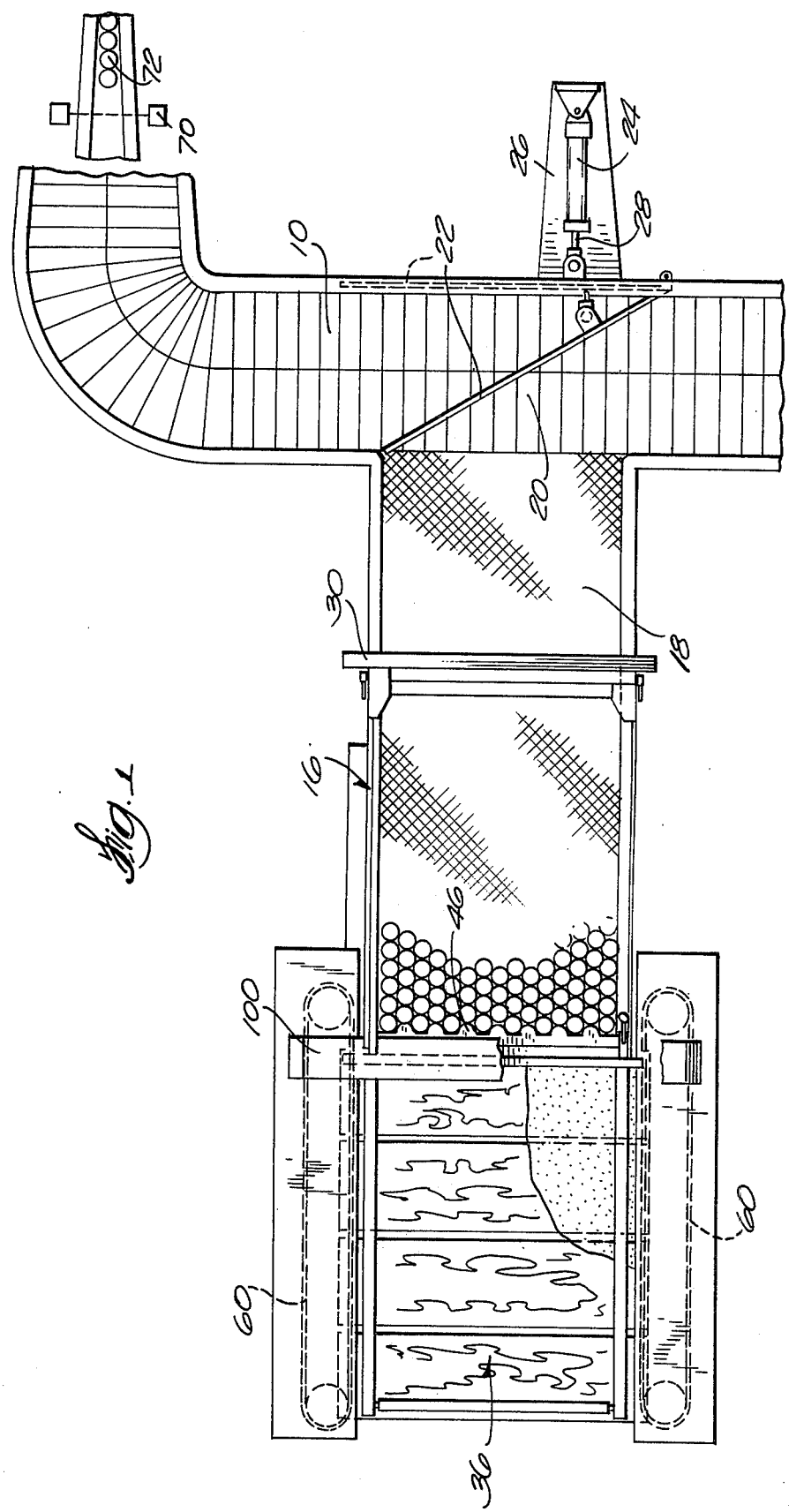
FIG. 1 is a plan view of the supplemental feed apparatus of the invention.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

In the drawings, FIG. 1 shows a first conveyor 10 which, as shown in FIG. 2, conventionally conveys cans from a can-making station 12 to a can-filling station 14. The supplemental feed apparatus of the invention is generally designated 16 and includes a reversible conveyor 18 transverse to or at right angles with the conveyor 10 and in communication with conveyor 10 at zone 20 for transfer of cans from one conveyor to another.

A diverter gate 22 is movable from a position parallel to the direction of movement of conveyor 10 as shown in broken lines (FIG. 1) to a solid position shown in full lines, and spanning conveyor 10 to divert cans onto conveyor 18 for purposes subsequently described. Movement of the diverter gate 22 is afforded by a power cylinder 24 carried by a bracket 26 with a piston rod 28 connected to the gate 22.

The supplemental feed apparatus 16 also includes a pattern-forming assembly 29 (FIG. 7) which includes lift assembly 30 to raise one end of the pattern-forming assembly 29 and fingers 32 which are employed to retain a pattern of cans 34 (FIG. 7) during movement into a pallet elevator 36. The lift 30 includes the same parts shown and described in my U.S. Pat. No. 3,788,497 and in which a bracket 36 is provided with a ramp 38, with the bracket carried by horizontally-spaced columns 40 having teeth in the form of a rack which cooperate with a pinion (not shown) for raising and lowering the columns 40. The fingers 34 are carried by a pair of spaced arms 42 and are connected to a pattern-forming bar 44. The lift assembly 30 raises the end of the pattern-forming assembly with the fingers to provide clearance above the cans as the pattern-forming assembly 29 is returned to shuttle successive complements of patterned cans to the pallet elevator for palletizing.

The pattern-forming bar 44 is of the type illustrated in FIG. 2 of my U.S. Pat. No. 3,788,497 and includes pattern-forming dies 46 (FIG. 1) which initiate the formation of a pattern of cans as shown in FIG. 1 as the cans are moved against the pattern-forming bar by the conveyor 18.

The supplemental feed apparatus 16 also includes means for detachably connecting a sweep bar 43 with the pattern-forming bar so that the sweep bar is free for independent movement during the depalletize mode subsequently described. Referring to FIG. 4, the pattern-forming bar 44 is provided with a latch 46 which is pivotally supported or connected to the pattern bar 44 by a shaft 45 (FIGS. 4, 5) which is connected to the pattern-forming bar and which is biased by spring 48 into engagement in a notch 50 in the sweep bar 43. Movement of the lever 58 connected to the latch from the full line position in FIG. 4 to the dotted line position in FIG. 4 releases the latch from engagement with the sweep bar and enables the pattern-forming bar 44 to be raised by a lift assembly 99 hereinafter described in detail.

When the sweep bar and pattern forming bar are latched together, the ends of shaft 45 nest in the yokes 47 in side plates 51 on the sweep bar to secure the sweep bar and pattern forming bar together so that they move in concert. They are moved in concert by chain drives 60 (FIG. 1) on each side of the pallet elevator 36. The chain drives 60 are similar to that shown in FIG. 2 of my U.S. Pat. No. 3,788,497. The chains 60 are connected to the sweep bar 60 by pins 61 and travel in a horizontal plane to reciprocate the sweep bar and pattern-forming bar from the position shown in FIG. 6 over conveyor 18 to the position shown in solid lines in FIG. 8 over the pallet elevator 36.

The pallet elevator 36 does not include a retractable apron or slip sheet and the pallet elevator lift can be chain-driven as shown in FIG. 3 of my previous U.S. Pat. No. 3,788,497.

In operation of the apparatus of the invention, a sensor such as an electric eye 70 (FIG. 1, FIG. 2) detects a lack of movement of the cans 72 downstream of the supplemental feed apparatus 16 and upstream of the can-making machine. If cans are not moving at a certain rate past the sensor 70 it means that an adequate supply of cans is being delivered to the can-filling machine 14. The sensor will actuate the power cylinder 24 through conventional electrical controls (not described herein) to move the diverter gate 22 (FIG. 1) into the diverting position shown in solid lines. Thus cans coming from the can-making machine 12 will be diverted onto the conveyor 18. The cans will engage the pattern-forming bar 44 in the FIG. 6 position and, when a pattern is accumulated, the fingers 32 will be lowered to engage the row 47 of cans (FIG. 7) to maintain the pattern 34 intact as it is shifted from the FIG. 7 position shown in solid lines to the dotted line position shown in FIG. 8. The fingers 57 separate the patterned complement from other cans on conveyors 18. The chains 60 are energized to cause the movement in concert of both the pattern-forming bar, the sweep bar, and the beams 42 and fingers 32. When the patterned can complement is over the pallet elevator the pallet is lowered from the FIG. 8 position and the step repeated to palletize successive patterned can complement layers on the pallet 80. As shown in FIG. 2, the filled pallets with empty cans can be stored on a conveyor 84 adjacent the pallet elevator 36. A supply of empty pallets can be stored on a conveyor 86 and be fed into the pallet elevator as required.

When the can-filling machine requires cans, they can be supplied either directly from the can-making machine by opening the diverter gate 22 or supplied from the supplemental feed apparatus, or from both.

When cans stored on filled pallets are to be depalletized, the pattern-forming assembly 29 and sweep bar 43 are moved in concert to the position shown in dotted lines in FIG. 8. The latch 46 is then released and the pattern-forming bar 44 is then elevated out of the flow path of the depalletized cans by a lift assembly 99 shown in FIG. 3. This assembly includes an overhead bridge 100 and a bracket 102 supported by slides 104 which reciprocate through openings 106 in the bridge 100. A power cylinder 108 is employed for raising and lowering the bracket 102. The bracket 102 has notches 105 movable into engagement with hooks 112 connected to the pattern-forming bar 44. When the hooks 112 are engaged with the flanges 114 on the bracket 102, the pattern-forming bar 44 can be elevated to the position shown in FIG. 9 with the shaft 45 lifted from the yoke 47 to afford separation of the sweep bar which is returned to the position shown in FIG. 9 to commence depalletizing. The fingers 32 are also elevated with the lift mechanism 30 to provide clearance for the flow of depalletized cans. Once the pattern-forming bar assembly 29 is elevated as shown in FIGS. 9 and 10, the sweep bar is shuttled back and forth over the pallet elevator to sweep layers of cans from the pallets across dead plate 114 onto conveyor 18 which is reversed to feed cans onto conveyor 10 to satisfy the requirements of the can-filling machine.

What is claimed is:

1. In conveying apparatus including a first conveyor for conveying containers between first and second stations, the improvement comprising second conveyor means in communication with said first conveyor at a communication zone, means selectively operable for diverting the containers coming from said first station on said first conveyor from said first conveyor to said second conveyor, a sweep bar and pattern-forming means associated with said second conveyor, a pallet elevator for carrying pallets for receiving containers from said second conveyor means, said second conveyor means being operable in first and second modes with said conveyor means in said first mode being operable with said pattern-forming means to form patterned container complements and convey the patterned complements to said pallet elevator for palletizing of the complements, and being operable in a second mode to convey containers from pallets in said elevator to said first conveyor in a conveying direction counter to the conveyor direction of said second conveyor in said first mode to supply containers to the second station, and wherein said pattern-forming means includes a pattern forming bar, and including means for reciprocating said sweep bar and pattern forming bar in the flow path of containers between said second conveyor and said pallet elevator in concert for movement from a position over said second conveyor to a position over said pallet elevator, means for detachably connecting said sweep bar and said pattern-forming bar for independent reciprocating movement of said sweep bar for depalletizing cans from pallets carried in said pallet elevator, and means for elevating the detached pattern forming bar during the depalletizing operation above the flow path of cans moved by said sweep bar onto said second conveyor from said pallet elevator.

2. The improvement of claim 1 wherein said first conveyor is provided with a container flow sensor between said second station and said communication zone to actuate said means selectively operable for diverting containers to cause containers to move from said first conveyor to said second conveyor means when containers are not required at the second station.

3. The improvement of claim 1 wherein said means for detachably connecting said sweep bar to said pattern forming bar comprises a latch on one of said sweep bar and said pattern forming bar and a shaft on said pattern forming bar engageable with yokes on said sweep bar.

4. The improvement of claim 1 wherein said means for elevating the detached pattern forming bar comprises a bridge over said second conveyor, a powered lift reciprocably supported on said bridge, and means on said lift detachably engageable with said pattern forming bar.

* * * * *